United States Patent [19]

Noda et al.

[11] Patent Number: 4,723,262
[45] Date of Patent: Feb. 2, 1988

[54] APPARATUS FOR PRODUCING SOFT X-RAYS USING A HIGH ENERGY LASER BEAM

[75] Inventors: Etsuo Noda; Setsuo Suzuki, both of Yokohama; Osami Morimiya, Tokyo, all of Japan

[73] Assignee: Kabushiki Kaisha Toshiba, Japan

[21] Appl. No.: 813,544

[22] Filed: Dec. 26, 1985

[30] Foreign Application Priority Data

Dec. 26, 1984 [JP] Japan ................... 59-273222
Dec. 26, 1984 [JP] Japan ................... 59-273223

[51] Int. Cl.$^4$ ........................................ H01J 35/00
[52] U.S. Cl. ........................................ 378/119; 378/143
[58] Field of Search ............. 378/119, 143; 376/103, 376/105, 106

[56] References Cited

U.S. PATENT DOCUMENTS 3,882,312 5/1975 Kepros et al. .............. 378/119
4,281,269 7/1981 Ledley .

FOREIGN PATENT DOCUMENTS 0145257 9/1982 Japan ..................... 378/119
58-158842 9/1983 Japan .
0133644 7/1985 Japan ..................... 378/119

OTHER PUBLICATIONS

High Brightness Laser/Plasma Source for High Throughput Submicron X-Ray Lithography—Alan L. Hoffman, George F. Albrecht, Edward A. Crawford, Feb. 1985.
Submicron X-Ray Lithography Using Laser-Produced Plasma as a Source—B. Yaakobi, H. Kim, and J. M. Soures, Oct. 1983.

Primary Examiner—Janice A. Howell
Assistant Examiner—David P. Porta
Attorney, Agent, or Firm—Banner, Birch, McKie & Beckett

[57] ABSTRACT

The soft X-ray apparatus of the present invention includes a vessel at low pressure or a vacuum in which a liquid target material, preferably mercury, is discharged in the form of a series of discontinuous droplets. The flow of the droplets of liquid target material is controlled by a control device, and synchronized with a high energy pulse beam, preferably a high energy laser pulse beam, provided by a laser device through a window in the vessel. In the preferred embodiment, this laser device also is controlled by the control device so that the laser pulse beam impinges a droplet of mercury inside the vessel to produce plasma to thereby generate soft X-rays. The droplets of mercury are sized to correspond to the size of the laser pulse beam at the point where the laser pulse beam impinges the droplet of mercury to maximize the strength of the soft X-rays and efficiently utilize the power of the high energy laser pulse beam. The soft X-rays exit the vessel through additional windows for subsequent use. A recovery mechanism is connected to the vessel to cover any unused liquid target material so that this material can be recirculated.

20 Claims, 5 Drawing Figures

APPARATUS FOR PRODUCING SOFT X-RAYS USING A HIGH ENERGY LASER BEAM

BACKGROUND OF THE INVENTION

The present invention relates to an apparatus for producing soft X-rays by impinging a high energy laser beam or other high energy electrically charged particle beam on a metal target. More particularly, the invention relates to an apparatus for producing soft X-rays from plasma for use in an X-ray exposure apparatus in a semiconductor manufacturing system.

As now generally known, soft X-rays can be generated by producing plasma at high temperature and high density. Plasma having sufficiently high temperature and high density to generate soft X-rays can be instantly produced by impinging a high energy beam, such as a laser beam, upon the surface of a solid metal target. The soft X-rays generated by plasma have a number of characteristics: (1) the X-rays have high brightness; (2) an X-ray beam is produced with a neary pin point source; (3) the X-rays are characterized by a short pulse; and (4) if an YAG-laser which has a large duty cycle is used, the X-ray source can be used for many repetitions.

Plasma X-ray apparatus have been used experimentally in submicron X-ray lithography and various measurement apparatus. In such experimental apparatus, a laser beam has been used to impinge on a target formed by a solid metal surface placed inside a vacuum vessel. Such experimental apparatus is disclosed in "Sov. Phys. Tech.", Phys., 28(7), p. 863 (1983) and "Submicron X-ray Lithography Using Laser-Produced Plasma As A Source", B. Yaakobi et al., Appl. Phys. Lett. 43(7), I, pgs. 686–688 (October 1983). However, experimental apparatus of the above type cannot be used in a practical application because of several disadvantages. First, regular replacement of the target material would be required, which would in turn necessitate breaking the vacuum of the vessel to remove the old target material and install new target material. This replacement procedure would be inconvenient and cause a considerable loss of time. Secondly, in the above experimental apparatus, windows are included on the vessel through which the laser beam or the X-rays pass. Because the target material is a solid metal, plasmatized material is formed which adheres to the windows of the vessel resulting in a decrease in the effective power of the laser beam impinging on the target material and lessening of the strength of the X-rays produced by the plasma.

An apparatus for preventing adhesion of plasma material on the windows of the vessel of a plasma X-ray apparatus is disclosed in Japanese Patent Disclosure No. 58-158842 filed in the name of S. Iwamastu on Sept. 21, 1983. The X-ray apparatus disclosed in this application uses a refrigerated target material such as a piece of ice, solid ammonia, solid Argon, Krypton or Xenon, or solid carbonic acid (dry ice). Such refrigerated target materials turn to gas upon being subjected to a high energy laser beam which avoids the problem of particles of plasma adhering to the windows of the vessel. However, the above apparatus is greatly complicated by the fact that the target material must be refrigerated. The apparatus also requires a complicated supply mechanism for the target material as discussed in an article in "Japanese Atomic Engineering", 26(7) pg. 594 (1984).

SUMMARY OF THE INVENTION

A primary object of the present invention is to provide a practical apparatus for producing soft X-rays by subjecting a material to a high energy laser beam or other high energy electrically charged particle beam. In this regard, it is an object of this invention to provide a soft X-ray apparatus which is power efficient, small in size, simple in construction and can be used repetitively over a long period of time without breaking open the vessel in which the material is subjected to the high energy beam.

Another object of the present invention is to provide a soft X-ray apparatus in which the material subjected to the high energy beam can be readily replaced without breaking open the vessel containing the material.

A further object of the present invention is to provide a soft X-ray apparatus which uses a liquid material such as a mercury as the target material to achieve the above advantages and objectives.

Yet another object of the present invention is to provide a soft X-ray apparatus which is simple to use, inexpensive to manufacture and has long life.

The soft X-ray apparatus of the present invention includes a vessel at low pressure or a vacuum in which a liquid target material, preferably mercury, is discharged in the form of a series of discontinuous droplets. The flow of the droplets of liquid target material is controlled by a control device, and synchronized with a high energy pulse beam, preferably a high energy laser pulse beam, provided by a laser device through a window in the vessel. In the preferred embodiment, this laser device also is controlled by the control device so that the laser pulse beam impinges a droplet of mercury inside the vessel to produce plasma to thereby generate soft X-rays. The droplets of mercury are sized to correspond to the size of the laser pulse beam at the point where the laser pulse beam impinges the droplet of mercury to maximize the strength of the soft X-rays and efficiently utilize the power of the high energy laser bulse beam. The soft X-rays exit the vessel through additional windows for subsequent use. A recovery mechanism is connected to the vessel to recover any unused liquid target material so that this material can be recirculated.

BRIEF DESCRIPTION OF THE DRAWINGS

The present invention can be more fully understood from the following detailed description when taken in conjunction with reference to the appended drawings.

DETAILED DESCRIPTION OF THE PREFERRED EMBODIMENTS

Figure 1:
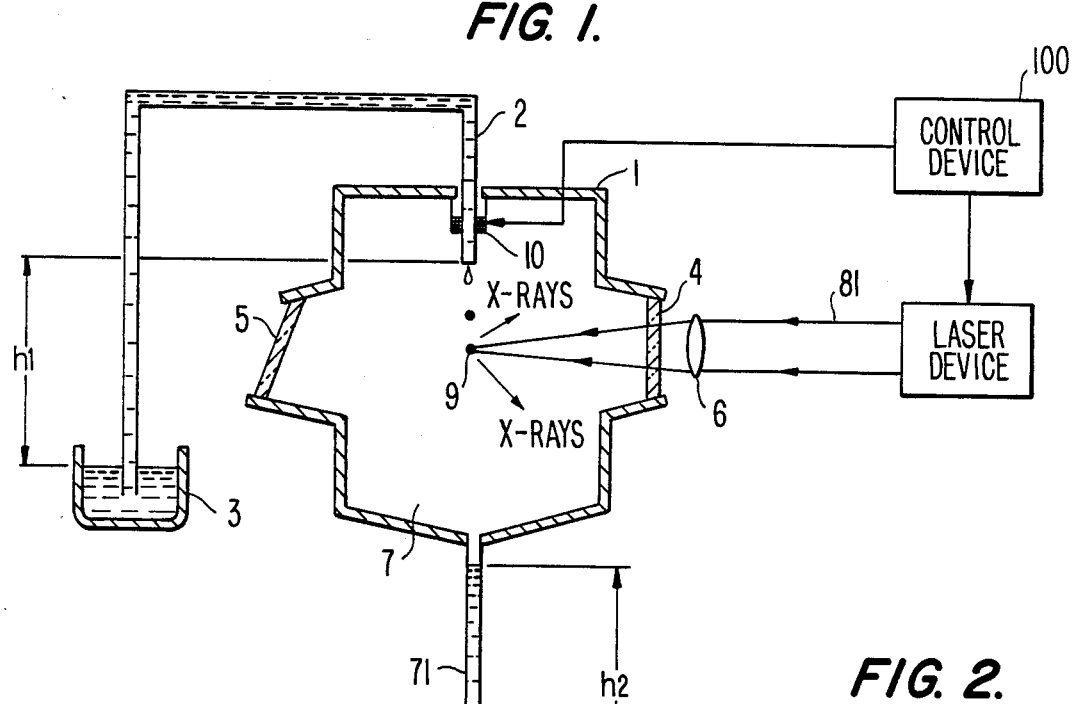
FIG. 1 is a schematic sectional diagram of apparatus for the production of X-rays according to a first embodiment of the present invention.

An apparatus for producing soft X-rays according to the present invention includes enclosed vessel 1 as shown in FIG. 1. Vessel 1 is preferably a vacuum vessel, although helium, hydrogen and other gases under low pressure may be used inside vessel 1. Vessel 1 includes an opening in its upper surface through which inlet tube 2 protrudes a short distance. Inlet tube 2 is a fine tube which carries a liquid target material, preferably mercury, from inlet reservoir 3 to the open end of inlet tube 2 inside vessel 1. As explained in greater detail below, the mercury target material is drawn through inlet tube 2 by the pressure due to that of reservoir 3 and the difference in height between inlet reservoir 3 and the open end of inlet tube 2 inside vessel 1 as illustrated by distance hI in FIG. 1. The mercury or other liquid target material drops from the open end of inlet tube 2 inside vessel 1 in a succession of discontinuous droplets as further explained below.

Figure 4:
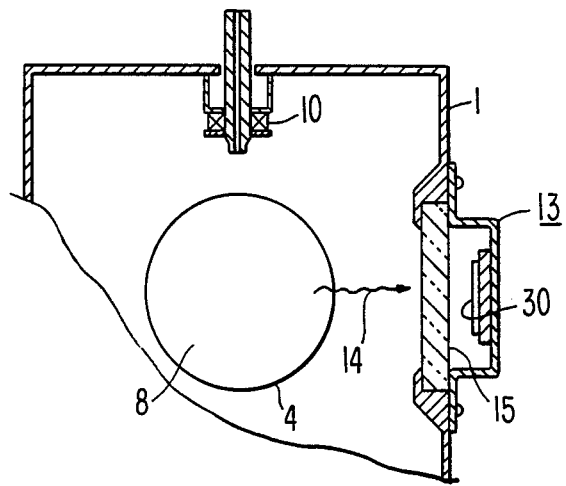
FIG. 4 is a schematic partly sectional diagram of the apparatus of FIG. 1.

Vessel 1 also includes a pair of transparent windows 4 and 5 on its side walls. Windows 4, 5 are transparent to incident laser beam 81, which will be further described below, and window 15 as shown in FIG. 4 is transparent to soft X-rays generated inside vessel 1. The unused (unabsorbed) portion of the laser beam must be permitted to leave vessel 1 through window 5 to avoid excessive heating inside vessel 1.

At bottom 7 of vessel 1, a recovery mechanism is located to recover unused (excess) mercury or other liquid target material passing through vessel 1 from inlet tube 2. Bottom 7 is shaped to guide the unused mercury to a bottom opening connected to outlet tube 71. Outlet tube 71 is connected to outlet reservoir 8 which is positioned a sufficient height h2 below bottom 7 of vessel 1 to permit the liquid target material to escape vessel 1. For example, when mercury is used as the liquid target material, height h2 is about 76 cm, height of tube 71 is greater than 76 cm which corresponds to one atmospheric pressure. Accordingly, liquid mercury can flow from vessel 1 into outlet tube 71 to outlet reservoir 8 for subsequent use again in inlet reservoir 3. Although not shown in FIG. 1, outlet 8 may be connected to inlet 3 in such a way as to carry liquid target material recovered from vessel 1 back to reservoir 3 for further use in vessel 1.

Laser device 110 is positioned adjacent window 4 of vessel 1 to direct a high energy laser pulse beam through window 4 inside vessel 1. Laser pulse beam 81 provided by laser device 110 is focused by lens 6 on an impact area inside vessel 1 where the laser pulse beam impinges drop 9 of liquid target material discharged from the open end of inlet tube 2. When mercury is used as the liquid target material, and vessel 1 is under low pressure or a vacuum, the high energy laser pulse beam is absorbed by drop 9 of mercury to produce plasma which generates soft X-rays. As mentioned previously, some portion of laser pulse beam 81 may not be absorbed by drop 9 of mercury, but this portion is directed outside vessel 1 through window 5. It should also be mentioned that, in the preferred embodiment, a pulse source for laser beam 81 is utilized because the laser beam must be a high energy laser beam ($10^{12}$ to $10^{14}$ watt/cm$^2$) to produce plasma and generate soft X-rays. At the present time, laser devices capable of producing a continuous laser beam at high enough energy are not available.

Control device 100 is coupled to laser device 110 and piezoelectric element 10 to control the timing of laser pulse beam 81 and the discharge of drops of mercury from inlet tube 2. Piezoelectric element 10 is positioned adjacent inlet tube 2 to vibrate inlet tube 2 under the control of control device 100 to cause drops of mercury to fall from inlet tube 2. Accordingly, control means precisely controls the emission of drops 9 of mercury and synchronizes the timing of laser pulse beam 81 and drops 9 to enable laser pulse beam 81 to impinge drops 9 in an impact area inside vessel 1.

Figure 3:
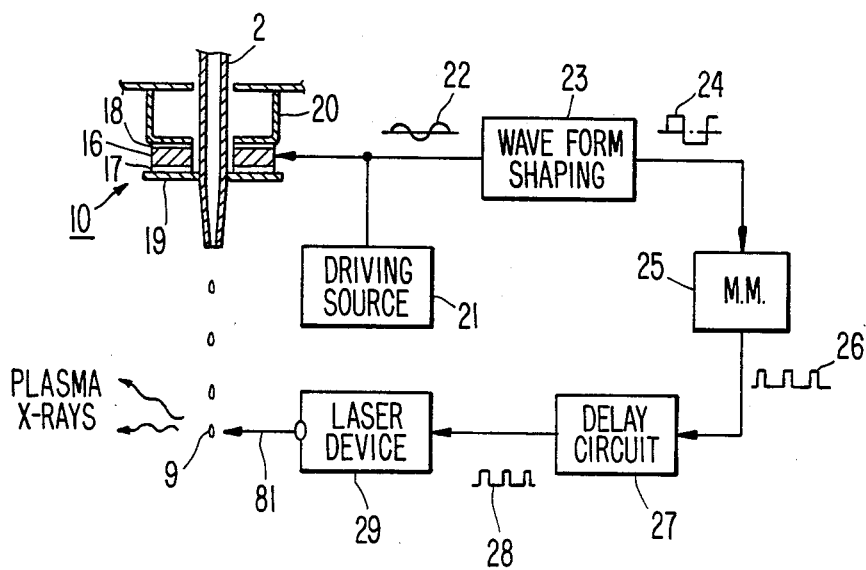
FIG. 3 is a schematic diagram of a control device for the X-ray apparatus shown in FIG. 1.

The details of control device 100, piezoelectric element 10 and laser device 110 are illustrated in FIG. 3. Piezoelectric element 10 includes electrodes 17 and 18 sandwiched around ceramic element 16 which is sized to provide an appropriate vibration to inlet tube 2. Electrode 18 is attached to vessel 1 by stud 20 and electrode 17 lies adjacent brim 19 near the inlet end of inlet tube 2. Electrode 17 is driven by conventional driving source 21 which generates sine wave signal 22 at approximately 1 KHz in the preferred embodiment. Driving source 21, which forms part of control device 100, also supplies the sine wave signal to conventional waveform shaping circuit 23 which generates square wave 24. Square wave 24 then is supplied to monostable multivibrator 25 which generates pulse signal 26. Pulse signal 26 is delayed by delay circuit 27 to generate delay pulse signal 28 to synchronize laser pulse beam 81 with mercury drops 9 in the impact area of vessel 1 to thereby produce plasma and generate soft X-rays.

In operation, liquid target material in the form of mercury is carried to the end of inlet tube 2 in vessel 1. Mercury is dropped from inlet tube 2 in discontinuous drops 9 upon vibration of piezoelectric element 10 on the end of inlet tube 2. The flow rate q (cm$^3$/sec) of the mercury in inlet tube 2 is determined by the following relationship:

$$q = \frac{\pi}{128} \frac{1}{\eta} \frac{D^4}{l} (P_o - \rho g h_1),$$

where
$\eta$=viscosity of mercury (poise),
D=inner diameter os inlet tube 2 (cm),
l=length of inlet tube 2 (cm),
$P_o$=pressure on mercury reservoir 3 (usually atmospheric pressure) (dyn/cm$^2$),
$\rho$=mass density of mercury (gram cm/sec$^2$),
g=acceleration of gravity (dyn) and
$h_I$=height difference between the end of inlet tube 2 and the surface level of mercury in reservoir 3 (cm).
Drops of mercury are discharged by inlet tube 2 in vessel 1 upon mechanical vibration of piezoelectric element 10 at a frequency dependent on the frequency of sine wave signal 22 applied to the piezoelectric element. The drop frequency of mercury drops 9 corresponds to f where f is the frequency of the sine wave signal, which is 1000 Hz in the preferred embodiment.

The timing of drops 9 in the impact area of vessel 1 is synchronized with the laser pulse beam which is driven by delayed pulse signal 28. In the preferred embodiment, the pulse rate of delayed pulse signal is 100 Hz as compared to the 1000 Hz sine wave signal applied to piezoelectric element 10. As a consequence, only one out of every ten drops of mercury is impinged by the laser pulse beam. The remaining drops of mercury are collected by the recovery mechanism and stored in outlet reservoir 8. The recovery mechanism also collects plasmatized mercury vapor once it returns to its natural liquid state by recombination. Although it might be possible to impact every drop of mercury, it is difficult with available laser technology to generate a sufficiently high energy in the laser beam to plasmatize the mercury drops at a rate corresponding to the drop frequency of the mercury. Similarly, it is not possible with present laser technology to generate a continuous laser beam with the requisite high power.

As another technique, the parameters of inlet tube 2 may be set so that mercury will not flow from inlet tube 2 absent the mechanical vibration provided by piezoelectric element 10. Mercury will not flow from inlet tube 2 when the height h1, inner diameter D and length l of inlet tube 2 satisfy the following relationship:

$$\frac{D^5}{l^2}(P_0 - \rho g h_1)^2 \lesssim 4096 \, \eta^2 \frac{\sigma}{\rho},$$

where
$\sigma$ = surface tension (dyn/cm).

Then, with the mechanical vibration of piezoelectric element 10 at the applied frequency f, drops 9 of mercury will be discharged by inlet tube 2 at the drop frequency f.

As explained in further detail below, absent the vibration action of piezoelectric element 10, drops of mercury would not fall from inlet tube 2 because the design parameters of inlet tube 2 are set to keep the surface tension within inlet tube 2 sufficiently high. Accordingly, control means precisely controls the emission of drops 9 of mercury and synchronizes the timing of laser pulse beam 81 and drops 9 to enable laser pulse beam 81 to impinge drops 9 in an impact area inside vessel 1.

To maximize the efficiency of the soft X-ray apparatus of the present invention in producing soft X-rays, the size of the drops of mercury should be approximately greater than or equal to the size of the laser pulse beam at the point of impact. This maximizes the absorption of the laser beam by the drops of mercury. In the preferred embodiment, mercury drop size d (cm) is in the range of 0.05. cm to 0.2 cm a focus spot size of the laser beam in about 100 cm. Mercury drop size, which is a function of the size of inlet tube 2 and height h1 is determined by the following equation:

$$d = \left(\frac{3}{64}\right)^{1/3} \cdot D^{4/3} \frac{(P_o - \rho g h_1)^{1/3}}{l \cdot \eta \cdot f}.$$

Figure 2:
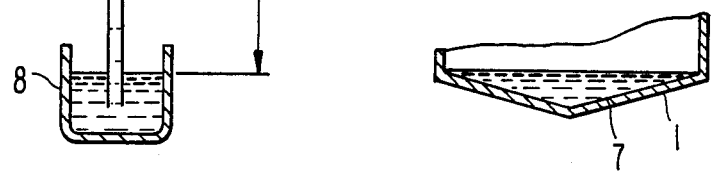
FIG. 2 illustrates a modification of the bottom of a vessel shown in FIG. 1.

A modification of vessel 1 is shown in FIG. 2 where the recovery mechanism has been removed. Instead of an opening in the bottom of vessel 1 for tube 71, a sealed V-shaped bottom is employed.

The soft X-ray apparatus of the present invention can be employed as an X-ray exposure apparatus in a semiconductor manufacturing system (lithography). In FIG. 4, the X-ray apparatus is shown generating X-rays 14 which are directed through polyethylene thin film 15 to semiconductor 30 mounted on window 13.

Figure 5:
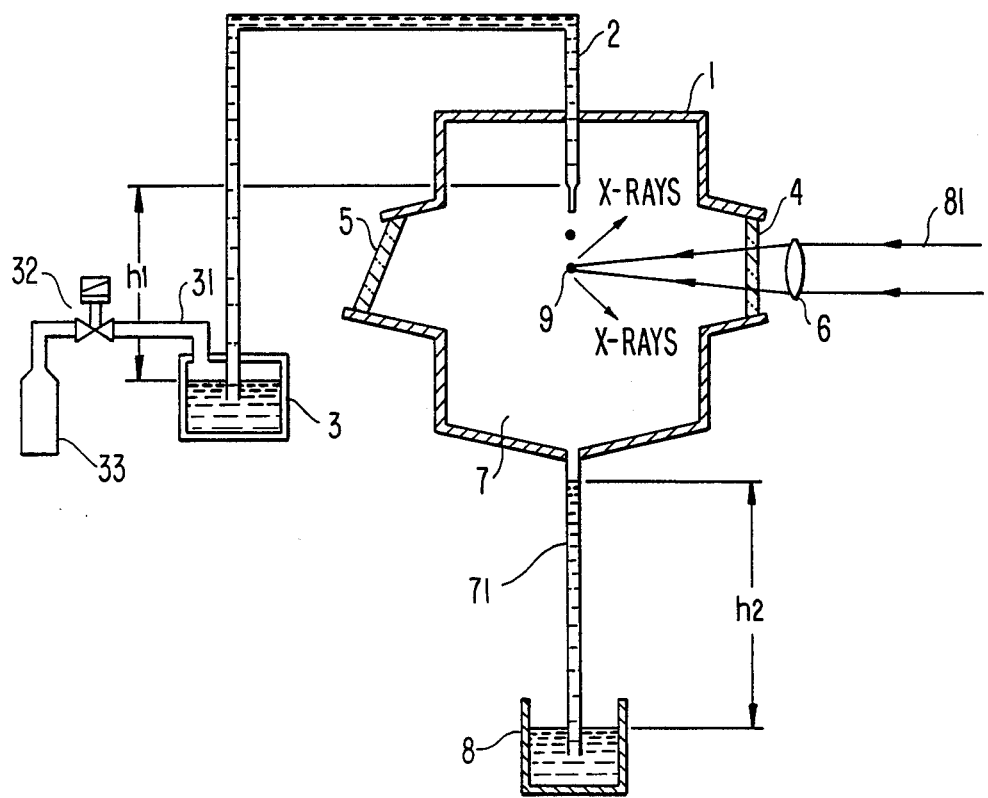
FIG. 5 is a schematic sectional diagram of a second embodiment of the present invention.

An alternative embodiment of the soft X-ray apparatus is shown in FIG. 5. Piezoelectric element 10 has been eliminated and replaced by a compressed air system applied to inlet reservoir 3 and inlet tube 2. Compressed air tank 33 is connected to inlet reversoir 3 by conduit 31. High speed electromagnetic valve 32 in conduit 31 oscillates the mercury in inlet reservoir 3 to force an appropriate amount of mercury through inlet tube 2 to form drops 9 in vessel 1. The timing of valve 32 is synchronized with the laser pulse beam which is controlled by a control device similar to control device 100 in FIG. 1. The pressure ΔP generated by the compressed air system is determined by the following relationship:

$$\frac{D^5}{l^2}(P_0 + \Delta P - \rho g h_1)^2 > 4096 \, \eta^2 \frac{\sigma}{\rho}$$

Although illustrative embodiments of the present invention have been described, the invention is not limited by the specific embodiments disclosed. A number of modifications can be made in the apparatus of the present invention without departing from the scope or spirit of the invention. For example, although mercury has been described as the preferred liquid material target, any metal with a low melting point under 100° C. can be used as the liquid material target provided an appropriate heating source is applied. Any one of the group of indium, gallium, cesium or potassium at an elevated temperature may be used. Another modification contemplated by the present invention is the replacement of discontinuous drops of liquid material with a continuous flow of the liquid material target, though disadvantages may be caused by continuous flow of the liquid material due to shock waves transmitted to the material upon impact with the high energy laser pulse beam.

One further modification specifically contemplated by the present invention is the use of an alternative high energy beam. A high energy relativistic electron beam, a heavy ion beam, a light ion beam or a charge coupled particle beam may be used instead of the high energy laser pulse beam. Although not all these alternative electron beams will produce plasma, all are capable of generating soft X-rays upon impinging a liquid material target in accordance with the present invention. Other variations and modifications may be apparent to those of ordinary skill in the art.

We claim:

1. Apparatus for producing X-rays comprising:
   a low pressure vessel;
   energy beam means for generating and supplying a high energy beamm to an impact area inside said low pressure vessel;
   a liquid material target capable of emitting X-rays when impacted by a high energy beam;
   target supply means associated with said low pressure vessel for supplying discontinuous drops of said liquid material target to the impact area inside said low pressure vessel; and
   control means coupled to said energy beam means for controlling said energy beam means so that the high energy beam impacts said liquid material target in the impact area of said low pressure vessel.

2. Apparatus according to claim 1 wherein said liquid material target is made of a low melting point metal with a melting point less than 100° C.

3. Apparatus according to claim 1 wherein said liquid material target is mercury.

4. Apparatus according to claim 1 wherein said liquid material target is one of the group of indium, gallium, cessium or potassium at an elevated temperature.

5. Apparatus according to claim 1 wherein said energy beam means generates a high energy laser beam to produce plasma and generate soft X-rays upon impact with said liquid material target.

6. Apparatus according to claim 1 wherein said energy beam means generates a high energy ion beam to produce plasma and generate X-rays upon impact with said liquid material target.

7. Apparatus according to claim 1 wherein said energy beam means generates a high energy relativistic electron beam to generate X-rays upon impact with said liquid material target.

8. Apparatus according to claim 1 wherein said low pressure vessel is a vacuum vessel.

9. Apparatus according to claim 1 wherein said low pressure vessel contains helium under low pressure.

10. Apparatus according to claim 1 wherein said low pressure vessel contains hydrogen under low pressure.

11. Apparatus according to claim 1 wherein said control means synchronizes the arrival at the impact area of the discontinuous drops of said liquid material target and the high energy beam.

12. Apparatus according to claim 11 wherein said control means is further coupled to said target supply means to control the manner in which the discontinuous drops of said liquid material target are supplied, said control means being further adapted to control the synchronization of the generation of the high energy beam.

13. Apparatus according to claim 12 wherein said control means comprises pulse drive means for generating pulses of the high energy beam and pulse delay means for delaying the pulses of the high energy beam to synchronize the pulses of the high energy beam with the discontinuous drops of said liquid material target.

14. Apparatus according to claim 12 wherein said control means further comprises vibration means coupled to said target supply means for vibrating said target supply means to disperse discontinuous drops of said liquid material target.

15. Apparatus according to claim 1 further comprising recovery means coupled to said low pressure vessel for recovering the liquid material forming said liquid material target after impact by the high energy beam.

16. Apparatus according to claim 15 wherein said recovery means comprises a tube attached near the bottom of said low pressure vessel and a reservoir connected to said tube for recovering the liquid material flowing through said tube.

17. Apparatus according to claim 1 wherein said low pressure vessel is seated and a transparent window is provided for entry of the high energy beam.

18. Apparatus according to claim 17 wherein said low pressure vessel is sealed and an emit transparent window is provided for emission of X-rays generated by said liquid material target.

19. Apparatus according to claim 1 wherein said liquid material target is made of discontinuous drops of liquid material and said target supply means includes compressed air means for applying compressed air to a reservoir of said liquid material target at a selected oscillation rate to force said discontinuous drops of said liquid material target into said low pressure vessel.

20. Apparatus acccording to claim 1 wherein the size of said liquid material target in the impact area is greater than or equal to the size of the high energy beam.

* * * * *